(12) United States Patent
Schechter

(10) Patent No.: US 11,715,114 B2
(45) Date of Patent: *Aug. 1, 2023

(54) METHOD AND APPARATUS FOR CAPTURE AND LOGGING OF FOOD SAFETY DATA

(71) Applicant: Digi International, Inc., Minnetonka, MN (US)

(72) Inventor: Harry J. Schechter, Needham, MA (US)

(73) Assignee: Digi International, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,033

(22) Filed: Nov. 7, 2019

(65) Prior Publication Data

US 2020/0175523 A1 Jun. 4, 2020

Related U.S. Application Data

(63) Continuation of application No. 14/529,040, filed on Oct. 30, 2014, now Pat. No. 10,475,046.

(60) Provisional application No. 61/897,535, filed on Oct. 30, 2013.

(51) Int. Cl.
*G06Q 30/018* (2023.01)

(52) U.S. Cl.
CPC ................. *G06Q 30/018* (2013.01)

(58) Field of Classification Search
CPC .......... G06Q 30/018; G08B 1/00; G08B 1/08; G08B 21/00
See application file for complete search history.

(56) References Cited

U.S. PATENT DOCUMENTS

| | | |
|---|---|---|
| 7,952,485 B2 | 5/2011 | Schechter et al. |
| 8,248,252 B2 | 8/2012 | Schechter et al. |
| 8,547,226 B2 | 10/2013 | Schechter et al. |
| 8,599,012 B2 | 12/2013 | Schechter et al. |
| 8,779,926 B2 | 7/2014 | Schechter |
| 10,475,046 B2 | 11/2019 | Schechter |

(Continued)

OTHER PUBLICATIONS

Najjar et al., Using a Wearable Computer for Continuous Learning and Support, 1999, Mobile Networks and Applications 4, pp. 69-74 (Year: 1999).*

(Continued)

*Primary Examiner* — Toan M Le
(74) *Attorney, Agent, or Firm* — Wolf, Greenfield & Sacks, P.C.

(57) ABSTRACT

A probe interface component for a probe that measures an environmental condition. The probe interface component may comprise a first interface configured to removably receive a probe, and a second interface configured to removably connect to an input interface of a mobile computer. The probe interface component may be configured to obtain a value from the probe based on the measurement of the environmental condition, and generate a signal representative of the value in a format compatible with the input interface of the mobile computer. The first interface, the second interface, and/or the input interface may comprise a wireless interface. The environmental condition may comprise a temperature, a humidity, a pressure, a water quality, a gas indication, a radiation level, an indication of contamination, and/or an appearance.

31 Claims, 6 Drawing Sheets

(56) References Cited

U.S. PATENT DOCUMENTS

| | | | |
|---|---|---|---|
| 2007/0139183 | A1 | 6/2007 | Kates |
| 2009/0096617 | A1 | 4/2009 | Purcell et al. |
| 2011/0035326 | A1 | 2/2011 | Sholl |
| 2013/0301673 | A1* | 11/2013 | Mobley .................... G01K 3/04 374/102 |
| 2013/0311140 | A1 | 11/2013 | Schechter |
| 2015/0120586 | A1 | 4/2015 | Schechter |

OTHER PUBLICATIONS

Google_Search_Results, Feb. 2, 2021, 2 pp. (Year: 2021).*
Kawano et al., [Demo Paper] Mirurecipe: A Mobile Cooking Recipe Recommendation System With Food Ingredient Recognition, Oct. 3, 2013, 2013 IEEE International Conference on Multimedia and Expo Workshops (ICMEW), San Jose, CA, 2 pp. (Year: 2013).*
Abstract Kawano et al. reference, Oct. 3, 2013, 1 pp. (Year: 2013).*
IEEE Xplore Search Results, Aug. 12, 2021, 1 pp. (Year: 2021).*
Google Search History, Aug. 12, 2021, 1 pp. (Year: 2021).*
Mattoli et al., Flexible Tag Datalogger for Food Logistics, Online Jan. 28, 2010, Sensors and Actuators A 162, 8 pp. (Year: 2010).*
Choi et al., An Architecture and Method Using MPEG-V Metadata in Smartphone and Sensor Aggregator, Jan. 27-30, 2013, ICACT 2013, pp. 139-142 (Year: 2013).*
[No. Author Listed], "Using and Calibrating Thermometers", HACCP-Based SOPs. National Food Service Management Institute. 2005 Available at http://sop/nfsmi.org/HACCPBasedSOPs/UsingandCalibratingThermometers.pdf. 3 pages.
U.S. Appl. No. 61/933,782, filed Jan. 30, 2014, Schechter et al.
U.S. Appl. No. 14/180,791, filed Feb. 14, 2014, Schechter et al.
U.S. Appl. No. 14/529,040, filed Oct. 30, 2014, Schechter.

* cited by examiner

METHOD AND APPARATUS FOR CAPTURE AND LOGGING OF FOOD SAFETY DATA

RELATED APPLICATIONS

This Application is a Continuation of and claims the benefit under 35 U.S.C. § 120 of U.S. application Ser. No. 14/529,040, entitled "METHOD AND APPARATUS FOR CAPTURE AND LOGGING OF FOOD SAFETY DATA", filed Oct. 30, 2014, which claims priority under 35 U.S.C. § 119(e) of U.S. Provisional Patent Application Ser. No. 61/897,535, entitled "METHODS AND APPARATUS FOR CAPTURE AND LOGGING OF FOOD SAFETY DATA" filed on Oct. 30, 2013. The entire contents of these applications are incorporated herein by reference in their entirety.

BACKGROUND

In the food safety industry it may be necessary to measure environmental data such as the temperature of food or the humidity of the environment to ensure that food is safe to eat. For example, United States law requires compliance with a Hazard Analysis and Critical Control Points (HACCP) program for the production and sales of juice and meat products, although HACCP approaches are also frequently used during production and sales of other foods. The HACCP methodology includes the use of monitoring procedures to both assess whether food is stored under conditions that safely maintain the food and to produce an accurate record of the monitoring for future verification of the monitoring or for investigating food safety incidents.

A common monitoring procedure in food safety is to measure the temperature of food and to create a log that will serve as proof that the measurement was made (for example, to satisfy HACCP requirements). To measure and log the temperature of food, a user may walk from location to location and measure food temperatures at each location using a portable measuring device. The user will log the temperature at each location, for example by writing down measured temperatures.

SUMMARY

In one aspect, the invention may relate to a flexible logging device that may be created by configuring a mobile computer, such as a smartphone or tablet, to interface with one or more environmental sensors. Such a configuration may allow the capture, consolidation and storage of multiple types of sensor data with readily available components. Configuration of the mobile computer may be achieved by programming the mobile computer such that aspects of the invention may be embodied as a non-transitory computer readable storage medium encoded with computer-executable instructions that, when executed, control the mobile computer to perform monitoring functions as described herein. Alternatively or additionally, aspects of the invention may be embodied in a computing device configured to implement one or more monitoring techniques as described herein.

In some embodiments, monitoring may be performed using industry standard environmental probes. The probes, such as temperature or humidity probes or pathogen sensors, for example, may be coupled to a probe interface component. The probe interface component may in turn be connected to a mobile computer via a standard input, such as an audio connector. The industry standard probe may be interchangeable with other such probes by connection to the probe interface component. Accordingly, some aspects of the invention may be embodied as a system, including a mobile computer, probe interface component and/or a probe.

Yet other aspects of the invention may be embodied as a probe interface component comprising a first interface configured to removably receive a probe and a second interface configured to removably connect to an input interface of a mobile computer. In some embodiments, the probe interface component may be configured to obtain a value from the probe and generate a signal representative of that value in a format compatible with the input interface of the mobile computer, even if the input interface was not specifically designed to receive probe measurements.

In some embodiments, the mobile computer may be configured as a logging device by controlling the mobile computer to record readings from a connected probe. The mobile computer may record, in connection with readings from a probe, information available via one or more components of the mobile computer. Such information may create a log of monitoring. The log may indicate what sensor readings were observed in conjunction with other log information, such as when the readings were observed, where the readings were observed, and/or by whom the readings were obtained.

In some embodiments, the information stored in connection with a measurement may include video of a measurement being made to provide a record of a stored measurement being made and further provide information about what was measured or the conditions of the measurement. Such video may be captured with a camera on the mobile computer. Data from other standard components of a mobile computer may alternatively or additionally be stored in conjunction with environmental measurements. This data may include information such as a time of a measurement, which might be obtained from a clock on the computer, or a position, which might be obtained from a GPS chip on the computer, or audio representing ambient sound or notations made by an operator, which might be obtained via a microphone of the mobile computer. Accordingly, aspects of the invention may be embodied as a method of operating a mobile computer to log data associated with environmental monitoring.

In another aspect, processing may be performed on recorded information. This processing may be performed in real time, as measurements are being made, or may be performed on measurements after they have been recorded. Results of such processing may be stored, communicated to a user through the user interface of the mobile computer, or may be communicated to any other suitable user interface or data processing system to which the mobile computer may be connected.

When processing of measurements is performed in real time, results of such processing may be used to generate messages via a user interface of the monitoring system of the mobile computer. In this way, for example, the user may be immediately alerted to environmental conditions outside of a predefined acceptable range. Alternatively or additionally, messages may constitute alerts that monitoring deviates from an established protocol or is otherwise being done improperly. Such processing may entail, for example, comparison of time, frequency or location of measurements with a stored monitoring protocol. As another example, the mobile computer may apply image recognition techniques to an image of a measurement being made to identify a type of probe used to make the measurement to ensure that a suitable probe is correctly framed in the video image, thus generating a message that may warn a user to avoid an inaccurate measurement being recorded.

Processing and storage of measurement data and other information may be performed totally or in part on the mobile computer. Alternatively or additionally, the processing and storage may be performed totally or in part on an external computing device. A mobile computer, for example, may be network enabled such that data, messages, commands and other information may be communicated between the mobile computing device and external computing device. The remote computing device may be configured to perform the same processing that might be performed on a mobile computing device, but may have greater computing resources such that larger data sets may be processed and stored. Alternatively or additionally, the remote computing device may perform processing not performed on the mobile computer, such as synthesis of data received from multiple mobile computers used to record environmental conditions. In this context, synthesis may entail combining data sets received at different times and/or from different locations as well as comparing such data sets or patterns in the data sets to detect deviations or anomalous conditions. With such synthesis, problems may be detected. Such problems, for example, may relate to particular food handling practices, actions of specific workers, operation of specific equipment operation or operation of specific facilities.

Accordingly, yet further aspects of the invention may be embodied as a system implementing an environmental monitoring process. The system may comprise a remote computing device that receives and processes monitoring data from one or more probes via mobile computing devices.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
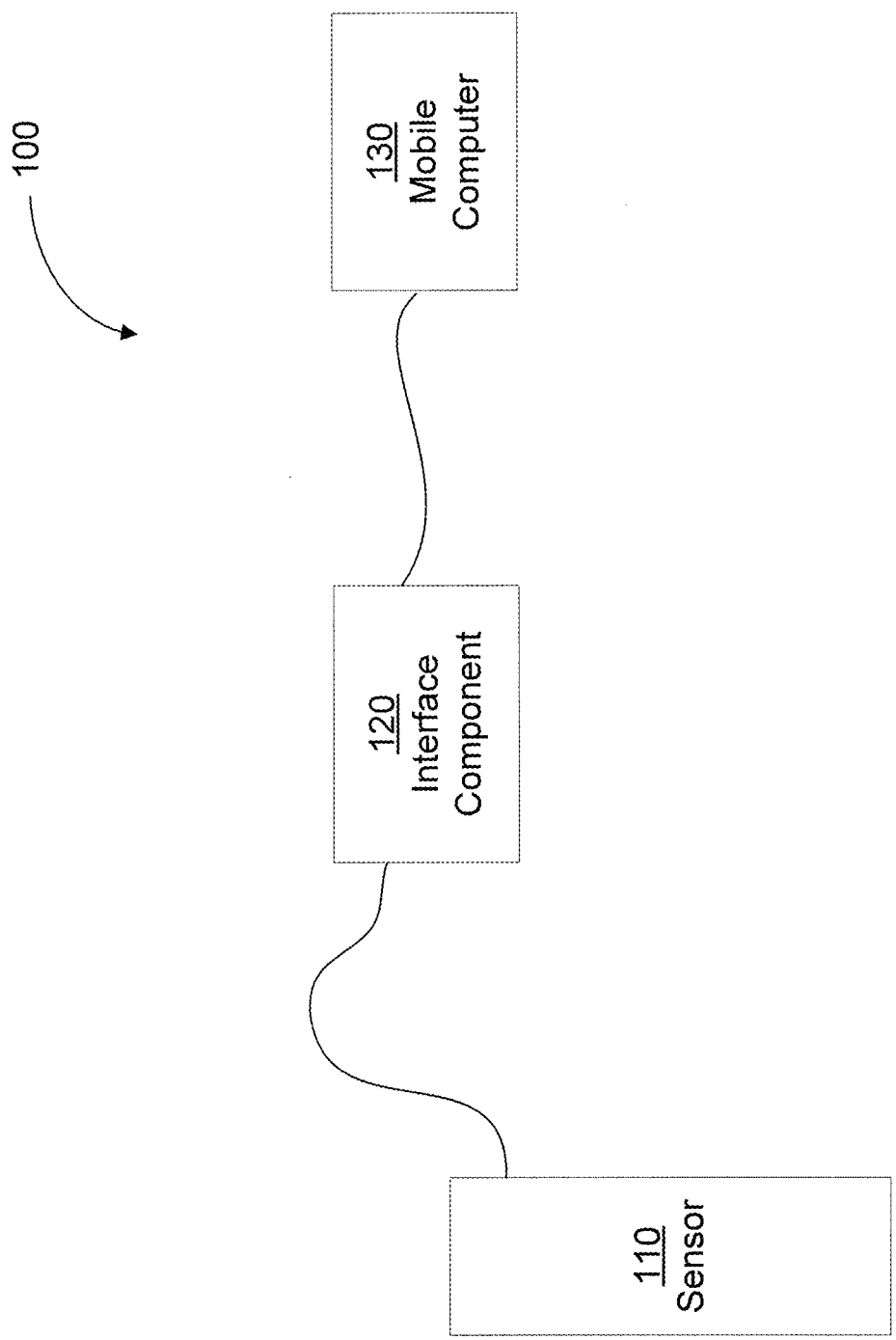
FIG. 1 illustrates a system suitable for capturing and logging food safety data, which may be used in connection with any of the embodiments of the invention.

The inventors have recognized and appreciated that a flexible logging device may be inexpensively formed from a mobile computer coupled to one or more environmental sensors via an interface component, allowing the capture, consolidation and storage of multiple types of sensor data. The interface component may couple food safety data from one or more sensors to the mobile computer. Additional data, including further sensor data, may be captured by the mobile computer in addition to the sensor data received via the interface component. The mobile computer may store data on any storage device accessible to the mobile computer, including devices accessible via wireless and/or wired connections.

The inventors have further recognized and appreciated that an interface component enables any of a number of standard (e.g., K type) environmental probes to provide data to a mobile computer, without modification of either the probes or the mobile computer. The interface component may have physical interfaces compatible with a standard probe output and a standard input to the mobile computer. The interface component may collect data from the probe and convert it to a format for passing through the input interface on the mobile computer. In some embodiments, the input interface may be an audio input such that the interface component modulates data from the probe on a signal in the audio range. Though, any suitable input interface on the mobile computer may alternatively or additionally be used, including a wireless communication interface. Regardless of the specific type of input interface used, a monitoring device may be implemented simply and inexpensively by programming the mobile computer to receive and process data from a connected probe.

The inventors have further recognized and appreciated that mobile computers typically incorporate multiple components that generate information that may facilitate monitoring functions. Such components may include a clock, camera, a GPS chip or other location service, touch interface, etc. Data from these components may be accessed programmatically through defined interfaces in the mobile computer or in any other way. By utilizing one or more sensors external to a mobile computer in conjunction with components present in the mobile computer, a wide range of data relating to food safety may be captured by the logging device. Configuring a mobile computer to capture data from these sources enables a user to leverage the capabilities of the mobile computer rather than needing to rely on a specialized device to combine and log sensor data.

Current techniques may utilize a logging device engineered to capture multiple types of sensor data, though may require devices with limited capabilities that are expensive and require training to operate. Moreover, since these current techniques utilize devices specifically engineered for a particular goal, the devices cannot be easily upgraded, for example to increase processing power or to allow capture of a new type of sensor data. In contrast, mobile computers are abundant, knowledge of how to operate them is widespread, and the software on a mobile computer is generally easy to upgrade.

The techniques described herein may allow easy interchange of probe types. In addition, they allow a user to use different mobile computers interchangeably within the logging device increasing accessibility to suitable devices, and allowing the user to easily upgrade aspects of the logging device, such as processing power, data storage, types of sensors, when desired. In some embodiments, the interface component may be connected to an audio port of a mobile computer, allowing probe data to be provided to the mobile computer via the audio port. Utilizing a standardized audio port of a mobile computer may allow an interface component to be used with a wide variety of mobile computers, including mobile computers not yet available in the marketplace. Furthermore, mobile computers typically include powered audio connections, allowing the interface component and/or the probe coupled to it to receive power via the audio port connection with the mobile computer. Though, in some embodiments the interface component and/or the probe may contain a battery or other separate power source.

In some embodiments, the logging device may communicate monitoring information via wireless and/or wired communication techniques. For example, the interface component may communicate information representing measurements made with a probe to the mobile computer using wireless and/or wired communication methods. Alternately, or in addition, the mobile computer may utilize wireless and/or wired communication methods to transmit logged data to a storage device.

In some embodiments, the logging device may be configured to utilize standard types of environmental sensors of the type used within one or more specific industries. By utilizing an interface component with industry-standard interfaces, the logging device may use environmental sensors already in popular use, allowing a high level of compatibility with existing sensor hardware. For example, the interface component may utilize a connector suitable for attaching standard thermocouple probe types.

By combining standard types of environmental sensors with a mobile computer, being a commonly used device, a user may utilize preexisting hardware to perform logging of sensor data. For example, a user wishing to log food safety data may own a mobile phone and in addition may have access to industry standard probes for measuring food temperatures. By obtaining a suitable interface component, and downloading software to the mobile phone, the user may perform detailed logging of food temperatures by combining the interface component with the temperature probe and their mobile phone.

In some embodiments, the mobile computer may be configured to perform analysis of logged sensor data. For example, the mobile computer may comprise one or more checklists that each perform one or more checks on logged data, such as checking whether a sensor reading falls within a particular range. By providing such a checklist to the mobile device, the system may perform quality assessments of the sensor data, and may, for example, request that a user take corrective action when sensor data indicates that environmental data falls outside of a desired range.

Following below are more detailed examples of various concepts related to, and embodiments of, methods and apparatus associated with a logging device utilizing a mobile computer. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a system suitable for capturing and logging food safety data, which may be used in connection with any of the embodiments of the invention. System 100 includes a sensor 110, interface component 120 and mobile computer 130. Sensor 110 may be any suitable type of sensor for capturing food safety data, such as but not limited to a temperature sensor, humidity sensor, image sensor, pressure sensor, etc. In addition, system 100 may include any number of sensors and is not limited to a single sensor coupled to the interface component.

Sensor data obtained by sensor 110 is provided to interface component 120, to which sensor 110 is coupled. The sensor data may be provided to the interface component via any suitable technique, including both wired and wireless techniques. For example, sensor 110 may be coupled to interface component 120 via a wired connection type, such as but not limited to USB, Firewire, audio, IEEE 802.3 (Ethernet), or any other wired connection. In some embodiments, sensor 110 is coupled to interface component 120 via an industry standard wired connection, such as a K type probe connection. Alternatively, or in addition, sensor 110 may be coupled to interface component 120 via a wireless connection type, such as but not limited to Bluetooth, IEEE 802.11, infrared, radio, etc.

Interface component 120 is configured to receive sensor data from one or more sensors, such as sensor 110, and to provide sensor data to mobile computer 130. Interface component 120 may optionally modify sensor data received from a sensor before providing the sensor data to the mobile computer. For example, interface component 120 may perform any suitable signal processing technique on a signal received from one or more sensors, including but not limited to filtering, converting from an analog to a digital format or vice versa, etc. In some embodiments, sensor data received by the interface component is in the form of an analog signal, and interface component 120 is configured to produce a digital signal based on said analog signal. For example, in a use case in which sensor 110 is configured to produce an analog signal comprising sensor data, and interface component 120 is configured to provide sensor data to mobile computer 130 in a digital format (e.g., when providing the sensor data via Bluetooth), interface component 120 may be configured to convert the analog signal received from the sensor to digital data to be sent to the mobile computer. Regardless of the format of the data to be sent to the mobile computer, it may be encoded in a signal compatible with the input interface on the mobile computer through which it will be provided.

In an embodiment in which the input interface is an audio input, that encoding may include, for example, amplitude modulating a signal in the audio frequency range with the data. Conventional hardware in a mobile phone may be programmed using known techniques to extract the data from such an audio signal such that the data may be made available to a logging application executing on the mobile phone. However, it should be appreciated that any suitable interface format may be used.

Interface component 120 may comprise one or more connectors configured to couple to one or more sensors, such as sensor 110. For example, interface component may include one or more connectors configured to be compatible with particular sensor types. Non-limiting examples of suitable connectors may include type K probe connectors (e.g., a "mini" connector), etc. However, any connection type utilized by sensor 110 may be incorporated into interface component 120.

Furthermore, interface component 120 may include one or more devices configured to combine signals from a plurality of sensors, such as sensor 110. For example, interface component 120 may be configured to combine signals from multiple sensors into a single signal to be provided to mobile computer 130. The combining may be performed, for example, by a multiplexor configured to multiplex received signals into a single signal, such as by performing frequency-division multiplexing or time-division multiplexing. However, any suitable technique to combine multiple signals into a single signal may be used in interface component 120, and may be performed using any suitable device(s). Processing (including the aforementioned techniques) may be performed on any or all received signals, including processing of the sensor data within a received signal, before, after or while combining one or more signals within interface component 120.

In some embodiments, interface component 120 receives power from one or more sensors, such as sensor 110, and/or from mobile computer 130. For example, a wired connection from interface component 120 to sensor 110 and/or mobile computer 130 may be of a type that provides power in addition to a signal comprising sensor data. In some embodiments, interface component 120 is coupled to mobile computer 130 via a wired audio connection, and receives power from the mobile computer by drawing power from an audio port on the mobile computer to which the connection is coupled.

Mobile computer 130 may be configured to receive sensor data from interface component 120. As indicated above, sensor data provided by interface component 120 to mobile computer 130 may not be the same as the sensor data received by the interface component. For example, the sensor data provided to mobile computer 130 may be provided in a different signal format (e.g., analog, digital, etc.) or may have been processed in some way (e.g., filtered or sampled) compared to the sensor data provided by sensor 110.

Mobile computer 130 may comprise any suitable mobile device able to receive and log sensor data. As non-limiting examples, mobile computer 130 may be a mobile phone, a tablet computer, a PDA, a notebook computer, or any other device capable of being carried by a user and used to receive and log sensor data.

Mobile computer 130 may be configured to receive signals from interface component 120 using any suitable wired or wireless communication technique. For example, interface component 120 may be coupled to mobile computer 130 via a wired connection type, such as but not limited to USB, Firewire, audio, IEEE 802.3 (Ethernet), or any other wired connection. Alternatively, or in addition, interface component 120 may be coupled to mobile computer 130 via a wireless connection type, such as but not limited to Bluetooth, IEEE 802.11, infrared, radio, etc.

Mobile computer 130 may comprise one or more processors in addition to one or more memory devices, and may utilize said processor(s) and memory device(s) to process and/or store sensor data received from interface component 120. Thus, food safety data captured by sensor 110 may be captured and logged in mobile computer 130. Processing of sensor data may include synthesis of sensor data, which may entail, for example, comparing and/or combining sensor data received from multiple sensors.

As used herein, the term "logging" refers to the storage of data, which may be performed over a period of time. For example, a sensor may measure, and/or a mobile computer coupled to the sensor may measure via the sensor, a temperature every 5 seconds, and subsequent to each measurement, a connected device may log (i.e., store the value of) the temperature measurement. Logging may include the storage of additional data associated with a first data type being logged. For example, when storing a temperature measurement, the time at which the measurement was taken may also be recorded in such a way that the logged time is associated with the logged temperature value. Additional data may additionally or alternatively include related metadata. For example, the additional data may include a name of the user of the device (e.g., provided via a user interface), an indication of whether a measured environmental quantity (e.g., temperature) is within a predetermined range, etc. Additional examples of logging data will be discussed below.

Figure 2:
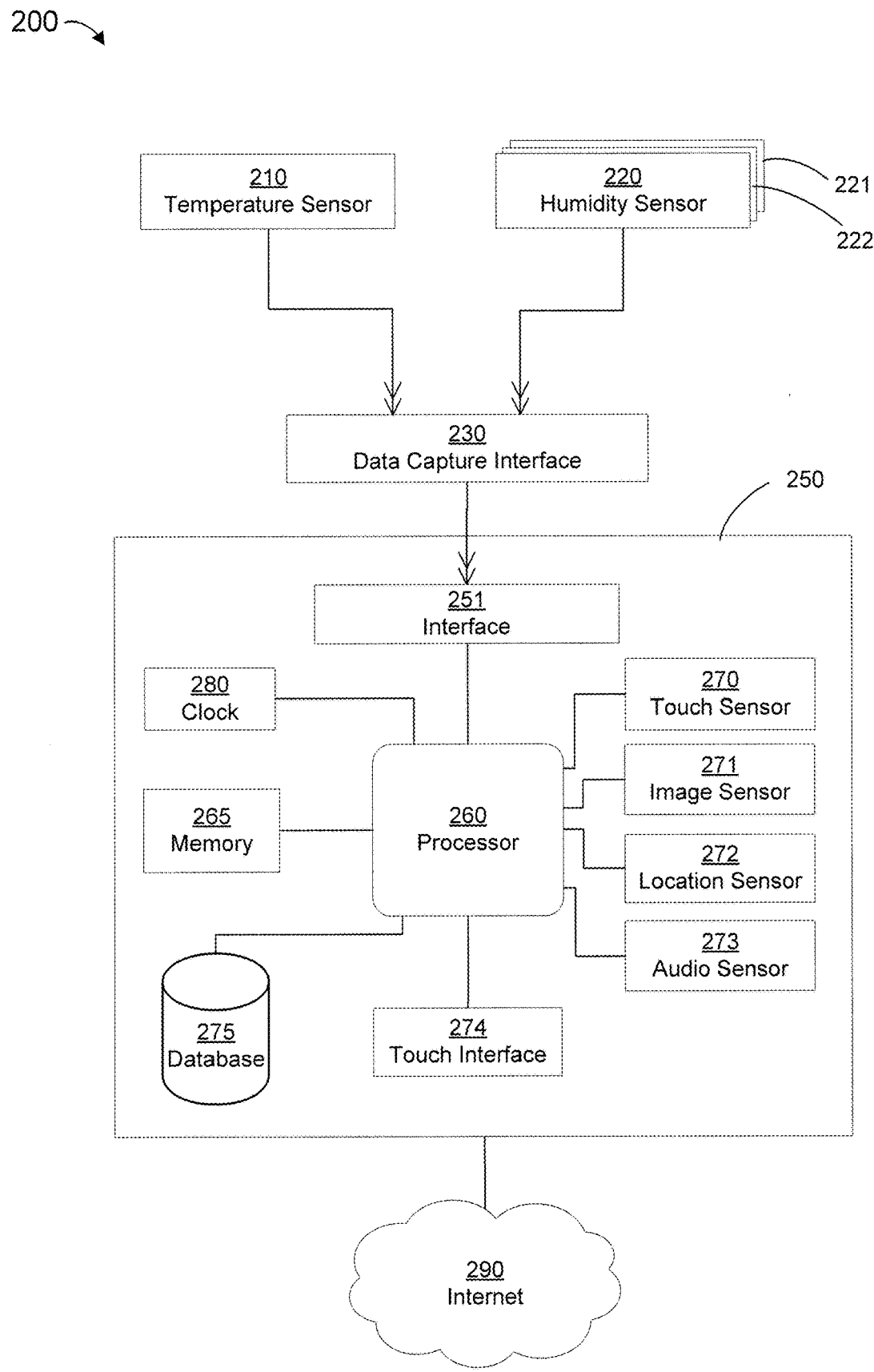
FIG. 2 is a schematic view of a system for capturing and logging food safety data, according to some embodiments.

FIG. 2 is a schematic view of a system for capturing and logging food safety data, according to some embodiments. System 200 includes a plurality of sensors, which include temperature sensor 210, humidity sensor 220 and additional sensors 221 and 222.

Sensor data captured by any or all of these sensors is provided to data capture interface 230, which provides data to mobile computer 250 for logging. Mobile computer 250 is coupled to Internet 290, which may allow the mobile computer to provide logging data to locations other than mobile computer 250. These elements of system 200 will be described in greater detail below.

Temperature sensor 210 may be any suitable device able to generate an indication of temperature. This may include, for example, air temperature probes, surface temperature probes, and/or immersion temperature probes. Though, any device able to transform a measure of temperature into an electrical signal may be used. In some embodiments, temperature sensor 210 is a K type thermocouple immersion temperature probe, which may for example be used to measure the temperature of foods by inserting the probe into the food.

Humidity sensor 220 may be any suitable device able to generate an indication of humidity. This may include, for example, a wall mounted humidity sensor or a humidity probe. Though, any device able to transform a measure of the amount of water vapor in the air into an electrical signal may be used. In some embodiments, a sensor, such as a humidity sensor, may communicate with the data capture interface via a wireless communication technique. Such a technique may be beneficial, for example, if the sensor is in an inaccessible or hard to reach location such that a wired communication technique is impractical. By utilizing suitable wireless communication techniques, a device such as mobile computer 250 may be configured to capture sensor data from any number of sensors in fixed locations.

System 200 also includes sensors 221 and 222, which may be of any suitable type. As non-limiting examples, sensors 221 and/or 222 may include: pressure sensors, water quality sensors, toxic gas sensors, radiation sensors, etc. As another example, in some embodiments, one or more of the additional sensors 221 and 222 may be food contaminant sensors. Such sensors may use techniques known in the art, or any other suitable techniques whether now known or hereafter developed, to detect pathogens or other food contaminants. For example, sensors that detect bacteria, such as salmonella or listeria, are commercially available and may be used as part of a system as described herein. It should be appreciated that any number of sensors of any type may be included in system 200.

Sensors may be housed in any number of physical devices, and are not limited to devices that each house a single sensor. For example, system 200 may include temperature sensor 210 and humidity sensor 220. In this example, these two sensors may be housed in a single device able to generate and output temperature and humidity data (for example, a single probe type device). As another example, a temperature probe may have, mounted on its tip, a pathogen sensor such that, while the temperature of a food product is being measured, pathogens in the food may also be detected. However, any suitable combination of sensors and devices may in practice be used and those sensors may be mechanically attached to one another, mechanically attached to a common support structure or mechanically separated from one another.

Irrespective of how many sensors are present in system 200, sensor data from any or all of the sensors may be provided to data capture interface 230. Data capture interface may be coupled to the sensors in any suitable way, including using any suitable wired or wireless technique. In some embodiments, temperature sensor 210 is connected to data capture interface 230 via a K type probe connector. This may, for example, allow for a single handheld device comprising a temperature probe and a data capture interface. In some embodiments, a sensor is coupled to data capture interface 230 by mating male and female connectors together from each of the sensor and data capture interface units.

In some embodiments in which multiple sensors are used concurrently, one or more of those sensors may communicate directly with a computing device, such as computing device 250. In other embodiments, each sensor may be connected, such as through wires, to data capture interface 230, which may in turn communicate with computing device 250.

Data capture interface 230 may optionally perform processing on sensor data received from one or more sensors, such as temperature sensor 210. For example, data capture interface 230 may convert an analog electrical signal from a sensor to a digital signal and/or may perform filtering (e.g., low pass filtering) on received signals from a sensor. However, these are provided as non-limiting examples, and in general any number and any type of signal processing steps may be performed by the data capture interface.

Irrespective of how and whether data capture interface 230 modifies the sensor data, the data capture interface provides a signal based upon the received sensor data to mobile computer 250. In some embodiments, data capture interface 230 comprises a multiplexor. The multiplexor may, for example, multiplex sensor data from multiple sensors coupled to the data capture interface.

Data capture interface 230 may be coupled to mobile computer 250 via any suitable method, including with any suitable wired or wireless technique. In some embodiments, data capture interface 230 is coupled to an audio port of mobile computer 250 and provides an audio signal to the mobile computer that represents one or more measurements captured by a sensor, such as temperature sensor 210. In such embodiments, data capture interface 230 may perform suitable processing on sensor data received from one or more sensors to generate an audio signal from which mobile computer 250 is able to obtain an indication of the sensor data (e.g., via software instructions executed on the mobile computer).

In some embodiments, data capture interface 230 provides a digital signal indicative of sensor data received from one or more sensors to mobile computer 250. For example, such a signal may be provided via a wireless connection between the data capture interface and the mobile computer (e.g., via the IEEE 802.11 standard, via Bluetooth, etc.), and/or via a wired connection (e.g., via the Universal Serial Bus (USB) standard etc.).

Mobile computer 250 is configured to receive a signal from data capture interface 230 and to perform logging of sensor data provided by the signal. As discussed above, a signal received by mobile computer 250 may be received via any suitable wired or wireless connection, and may be provided in any suitable analog or digital format. Mobile computer 250 comprises interface 251, which may receive a signal from data capture interface 230 provided in any of the forms identified above. As non-limiting examples, interface 251 may be an Ethernet port, a wireless antenna (e.g., suitable for IEEE 802.11, GSM, CDMA, Bluetooth, etc. communication), an audio port (e.g., a connector suitable for a microphone or headphone jack, such as a 3.5 mm jack), a USB port, etc. It should be appreciated that mobile computer 250 may comprise any number of interfaces, of any type, allowing data capture interface 230 to communicate with the mobile computer using one or more different techniques. In some embodiments, mobile computer 250 is a mobile telephone and may comprise some combination of: a cellular antenna (e.g., GSM and/or CDMA, etc.), an IEEE 802.11-compatible antenna, a 3.5 mm audio port and/or a USB port. However, in general any number and type of interfaces may be provided in mobile computer 250.

Irrespective of the particular type of interface(s) provided in mobile computer 250, signals received via interface 251 are provided to processor 260. Processor 260 may comprise any suitable circuitry for executing instructions, such as a general purpose microprocessor. Processor 260 is coupled to memory 265 which may comprise any suitable volatile and/or non-volatile storage device, including but not limited to Read Only Memory (ROM), Random Access Memory (RAM), disk drives (including solid state and/or hard disk drives), Flash memory, etc. It should be appreciated that any number of such memory devices may be coupled to processor 260 and that memory 265 is provided merely as an example.

Processor 260 executes instructions, which may be for example software instructions retrieved from memory 265. The executed instructions may process signals received from data capture interface 230 and extract sensor data from the signals for logging. Once extracted, sensor data may be stored in any suitable location, including memory 265 and/or database 275. Additionally or alternatively, sensor data may be provided to a remote location via Internet 290. Internet 290 may provide access to any remote location via any suitable wired or wireless connection. For example, mobile computer 250 may provide sensor data for logging to a File Transfer Protocol (FTP) server, to a Network Attached Storage (NAS) device and/or to a server accessible via the World Wide Web (WWW). Mobile computer 250 may provide sensor data to Internet 290 via any suitable interface, including any of those identified above relating to interface 251.

In addition, or alternatively, to sensor data embodied in one or more signals received via interface 251, processor 260 may log sensor data obtained from one or more sensors comprised by mobile computer 250. For example, a sensor present in mobile computer 250 may capture sensor data at the same time, or around the same time, as one or more sensors external to the mobile computer, such as temperature sensor 210. System 200 includes exemplary mobile computer sensors 270-273, described in further detail below. In this context, an "external sensor" refers to a sensor not an integral part of mobile computer 250, and a "mobile computer sensor" refers to a sensor that is an integral part of the mobile computer. As discussed below, any number of either type of sensor may be utilized in system 200.

In some embodiments, processor 260 is configured (e.g., via software instructions) to log sensor data from any number of mobile computer sensors (e.g., sensors 270-273), and at least one sensor external to mobile computer 250 (e.g., temperature sensor 210), and to store sensor data such that an association exists between the sensor data captured from each sensor. For example, sensor data from temperature sensor 210 may be combined with sensor data from location sensor 272 and stored such that an association exists between the location data and the temperature data. In this example, each temperature reading would thereby be associated with a location, for example to provide an indication of where each temperature reading was taken. However, processor 260 may in general combine sensor data from any number of mobile computer sensors and external sensors, and in some embodiments may combine sensor data from multiple external sensors (e.g., temperature sensor 210 and humidity sensor 220) without combining this sensor data with any data provided by any mobile computer sensors. Comparing and/or combining sensor data may, for example, enable identification of food handling problems represented by the sensor data. For example, comparing sensor data may identify problematic food handling practices by recognizing, for example, particular locations that frequently yield sensor data with undesirable measurements.

Associations between sensor data being logged may be created in any suitable way, including but not limited to storing associated data in a separate file, by storing an identifying value (e.g., a unique identifier) with the associated data, etc. In some embodiments, database 275 is a relational database and sensor data may be stored in the database such that an association exists between the sensor data captured from each sensor that provided a portion of the sensor data. For example, a database table may comprise a column for each type of sensor data (e.g., temperature, humidity, location, etc.) and logging may comprise creating a new row of this table. However, any suitable method for storing data such that associations exist between data elements may be used, as are well known to those of skill in the art.

In some embodiments, processor 260 is configured to log identifying information in addition to sensor data. The identifying information may be logged alternatively, or in addition to, sensor data from any number of sensors, including both mobile computer sensors and external sensors. Identifying information may comprise information that was not provided by a sensor, though may be logged with sensor data such that an association exists between the sensor data and the identifying information. As non-limiting examples, the identifying information may include a date, a time, the name of a user of system 200, and/or an indication of whether a sensor measurement fits particular criteria. The latter identifying information may be included, for example, to log a measure of quality with logged sensor data. For example, food standards may require the temperature of food to be within a particular range of temperatures. When a temperature is captured and logged (e.g., by temperature sensor 210 providing sensor data to mobile computer 250), an indication of whether the temperature is, or is not, within that particular range may be logged such that an association exists between the indication and the temperature. Data utilized to generate this indication (e.g., the upper and lower values of a temperature range) may be, for example, stored in memory 265 and/or database 275. In some embodiments, the indication may be provided to a user, for example, by display in a user interface and/or by generating a report.

In some embodiments, data may be stored in memory 265 and/or database 275 and used to generate identifying information. For example, the name (e.g., full name and/or username) of the user of system 200 may be stored in memory 265 and/or database 275. Alternatively, or additionally, quality metrics may be stored that indicate some measure of quality for a given measurement of a given sensor type. As non-limiting examples, the measure of quality may be "Pass" or "Fail," or may include more than two states (e.g., a score from 1 to 10). Quality metrics may utilize one or more types of sensor data to produce a measure of quality; for example, a temperature reading and a humidity reading may both be used to produce a quality score.

In some embodiments, one or more checklists may be stored in memory 265 and/or database 275 and used to direct capture of sensor data logged by mobile computer 250. For example, a checklist may include a plurality of sensor data measurements, and may direct a user of mobile computer 250 to perform these measurements in a prescribed sequence. Alternatively, or additionally, a checklist may perform quality analysis on sensor data logged by mobile computer 250. For example, data contained within the checklist may be used by mobile computer 250 to determine that sensor data from a particular measurement falls outside of a particular quality range, e.g., a measured temperature is too low or too high based on some upper and lower bounds provided by the checklist.

In some embodiments, one or more checklists comprise directed tasks unrelated to the capture of sensor data. For example, a checklist may comprise a direction to clean a particular surface. A user of mobile computer 250 may perform the cleaning task and provide an indication to mobile computer 250 as to whether the task was completed successfully or not.

Checklists may be provided to mobile computer 250 in any suitable manner. In some embodiments, one or more checklists are wirelessly provided to mobile computer 250 via Internet 290. For example, an application executing on mobile computer 250 may initiate transfer of one or more checklists to the mobile computer. However, a transfer of one or more checklists to mobile computer 250 may be triggered in any suitable manner.

In some embodiments, a checklist comprises corrective actions that may be performed when sensor data falls outside of a quality range. For example, when a temperature is measured to be higher than a quality range, the checklist may comprise a corrective action that the temperature should be measured again after a particular amount of time has passed. Alternatively, or in addition, the corrective action may indicate that changes to the environment should be performed (e.g., increase air conditioning). A corrective action may be indicated to a user in any suitable manner, including via a display and/or an audio interface coupled to mobile computer 250.

In some embodiments, when sensor data from a measurement falls outside of a quality range and/or when a directed task unrelated to the capture of sensor data is not completed successfully, mobile computer 250 may log this event as an exception. For example, when the temperature of a particular food is measured to be higher than a prescribed maximum temperature for that food, and/or when a user checks the stock of paper towels, mobile computer 250 may store and/or transmit an indication of the exception, for example via memory 265 and/or database 275, and/or Internet 290, respectively.

In some embodiments, one or more checklists may be modified by a user with administrative privileges. For example, an administrator may modify a checklist located on a server, which may then be provided to one or more mobile computers (such as mobile computer 250) via Internet 290. The server, for example, may be programmed to restrict access to an electronic data structure storing that list for the purposes of modifying based on credentials supplied in connection with an attempting to access the list, while allowing other requests, associated with other credentials, to read the list without modification.

Mobile computer 250 includes touch sensor 270, which may comprise any sensor able to convert touch from a user into electrical signals. For example, touch sensor 270 may be part of any suitable display that utilizes resistive and/or capacitive sensing technologies. Processor 260 may be configured to perform processing of sensor data provided by touch sensor 270. For example, processor 260 running software instructions may identify commands provided by a user via touch interface 274 and perform logging operations accordingly (e.g., to start or stop logging). Additional or alternatively, touch sensor 270 may be utilized to interact with mobile computer 250, for example via one or more user interfaces. Thus, a user may view and interact with any information, including sensor data and/or information derived from sensor data, by providing input to the touch sensor.

Mobile computer 250 includes image sensor 271, which may comprise any sensor able to convert incoming light into electrical signals. For example, image sensor 271 may be a Charge Coupled Device (CCD) or a complementary metal-oxide-semiconductor (CMOS) active pixel sensor, and may be configured to produce static images and/or video images. Processor 260 may be configured to perform processing of sensor data provided by image sensor 271. For example, processor 260 running software instructions may log video taken by a user while capturing food safety data using a sensor. This may allow a user to produce a video record of the capturing of food safety data to serve as proof that the measurement was made. For example, image recognition of the video record may identify one or more features on a housing comprising a sensor, such as a barcode or other unique feature.

Mobile computer 250 includes location sensor 272, which may comprise any sensor able to receive a signal indicative of a location of the mobile computer. For example, location sensor 272 may be a Global Positioning System (GPS) sensor, and/or may comprise wireless sensors able to identify a location within a room. Processor 260 may be configured to perform processing of sensor data provided by location sensor 272. For example, processor 260 running software instructions may associate the location of mobile computer 250 with sensor data by creating an association between them during logging, as described above. Since it is presumed that a user of the mobile computer 250 is holding or otherwise close to the mobile computer, a location captured by the location sensor may effectively capture the location of the user.

In some embodiments, sensor data provided by location sensor 272 may be combined, for example by processor 260, with other sensor data to provide reporting information. For example, measurements of temperature may be combined with location data to provide an indication of whether the temperature measurement was taken in the intended location. A user of system 200 may otherwise generate a temperature measurement in a location different than intended (e.g., when mistakenly measuring the temperature of food that is not the intended food), without a record of the mistake being generated. Combining location data with sensor data may therefore provide a data quality indication pertaining to any or all sensor data logged by system 200.

Mobile computer 250 includes audio sensor 273, which may comprise any sensor able to convert sound waves into electrical signals. For example, audio sensor 273 may be a microphone. Processor 260 may be configured to perform processing of sensor data provided by audio sensor 273. For example, processor 260 running software instructions may identify speech commands provided by a user and perform logging operations accordingly (e.g., start/stop logging).

In some embodiments, mobile computer 250 is configured to generate an alarm at a particular time or times. For example, an alarm time may be stored in memory 265 and/or database 275 and used in combination with clock 280 to generate an indication of an alarm at the stored time(s). Data describing alarm times may be received, for example, via Internet 290. An alarm may be delivered to a user in any suitable way, including via a display and/or an audio interface coupled to mobile computer 250.

In some embodiments, an alarm indication may be associated with one or more checklists. For example, a checklist may comprise one or more alarm times that will trigger an indication, as an alarm, that the checklist is to be followed. A user of mobile computer 250 may thereby receive an indication, at a particular time of day and/or particular day of the week, to begin following a checklist.

In some embodiments, processor 260 is configured to produce reports from logged data stored in memory 265 and/or database 275. For example, food quality reports may be created from logged food safety data by software running on processor 260. Such reports may be presented to a user via any suitable display connected to mobile computer 250 (e.g., built-in displays and/or displays connected to the mobile computer), and/or may be provided to an external storage medium via Internet 290 (e.g., to a URL, to a NAS device, etc.)

Figure 3:
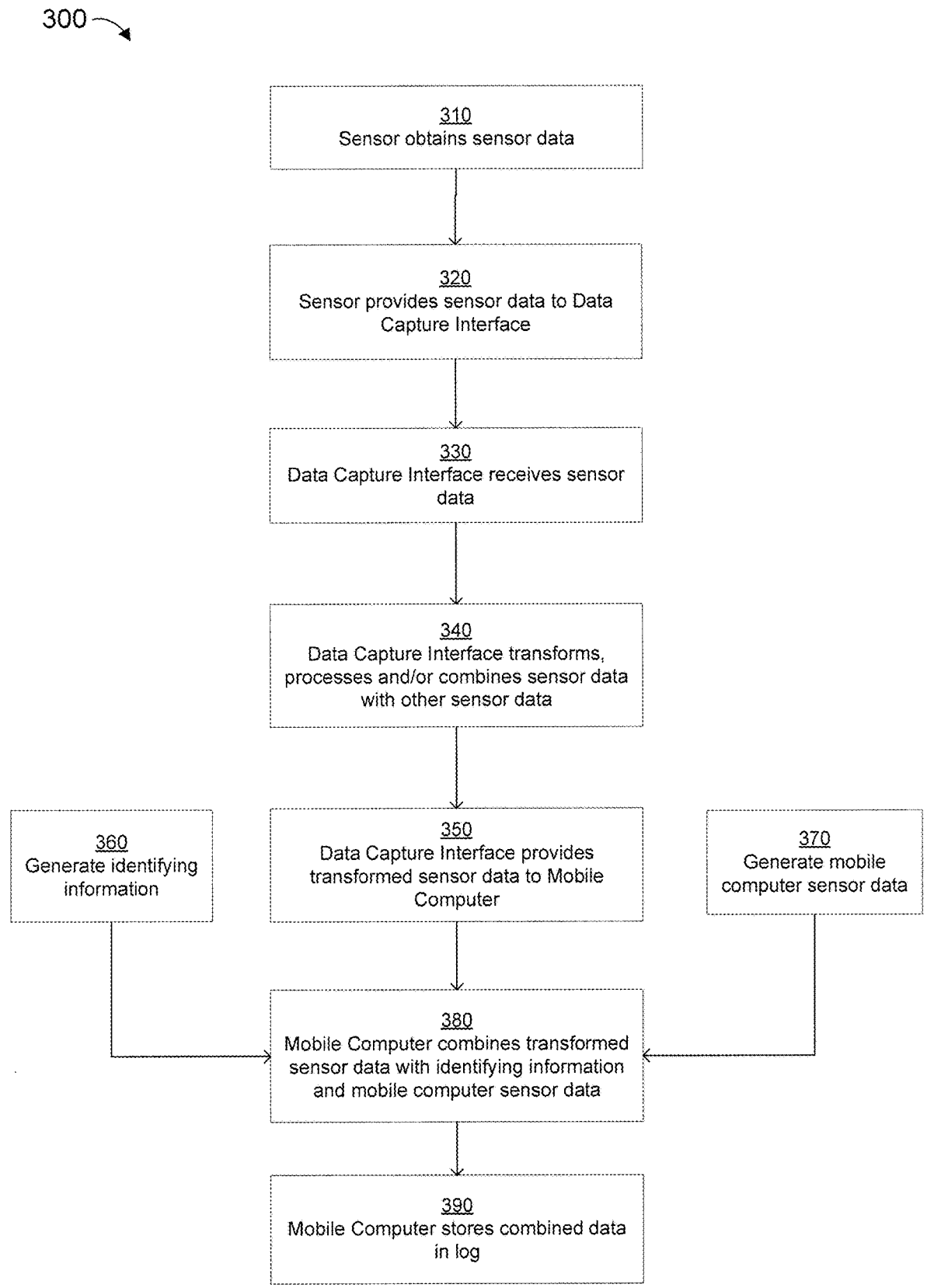
FIG. 3 is a flow chart illustrating a method of capturing and logging food safety, according to some embodiments.

FIG. 3 shows a method of capturing and logging food safety, according to some embodiments. The method of FIG. 3 may, for example, be performed by system 100 shown in FIG. 1 and/or system 200 shown in FIG. 2. In the example of FIG. 3, method 300 begins with act 310 in which a sensor obtains sensor data. The sensor may be of any suitable type, including such sensors as described above, including temperature sensors.

In act 320, the sensor provides sensor data to a data capture interface, and in act 330 the data capture interface receives the sensor data. The data capture interface may receive sensor data from any number of sensors and in act 340 performs processing on the sensor data, for example to transform the sensor data and/or to combine sensor data from one sensor with sensor data from another sensor, as described above.

In act 350, the data capture interface provides the transformed sensor data to a mobile computer. As described above, a mobile computer may be a mobile phone, a tablet computer, a PDA, a notebook computer, or any other device capable of being carried by a user and used to receive and log sensor data.

In act 360, identifying information is generated, which may comprise generating data to be associated with the sensor data that is not generated by a sensor. As discussed above, examples of identifying information may include a date, a time and/or a username, etc.

In act 370, mobile computer sensor data is generated, which may comprise generating sensor data from one or more sensors internal to the mobile computer. In act 380, the mobile computer combines the transformed sensor data with the identifying information and the mobile computer sensor data. In some embodiments, this combining comprises storing data from the three sources such that an association exists between the data. For example, temperature data from the sensor may be combined with a date and time as identifying information, and with video data from a mobile computer image sensor. In this example, the logged data may include an association between the temperature, date, time and video such that there is an indication that they are associated with the same event (e.g., a measurement of temperature).

In act 390, the mobile computer stores the combined data in a log. Storing may comprise storing on a memory device in the mobile computer (e.g., RAM, Flash memory, etc.)

and/or providing the combined data to a remote location, such as a NAS device and/or a server accessible via the World Wide Web.

It will be appreciated that method 300 is not limited to the particular steps described above, and that variations of the above acts will readily occur to those skilled in the art. For example, act 380 may generate data for logging using any number of the sensor data, identifying information and/or mobile computer sensor data. That is, data for logging may comprise: only sensor data, only identifying information, only mobile computer sensor data, only sensor data and identifying information, only sensor data and mobile computer sensor data, only identifying information and mobile computer sensor data, or sensor data, identifying information and mobile computer sensor data. In addition, any number of sensors and mobile computer sensors may generate data for inclusion in method 300 such that the logged data represents the capture of food safety data from a variety of sensors.

Figure 4:
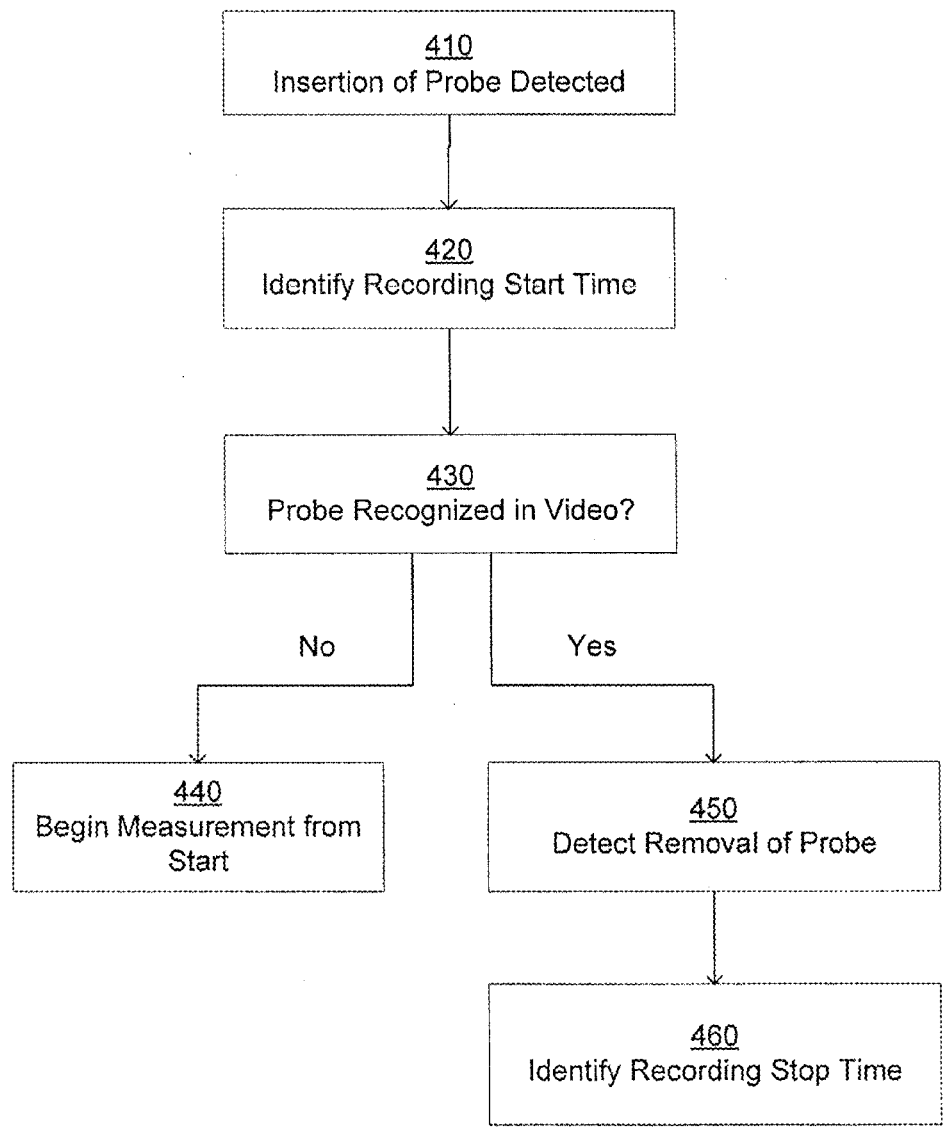
FIG. 4 is a flow chart illustrating a method of capturing and logging video associated with a temperature measurement, according to some embodiments.

FIG. 4 shows a method of capturing and logging video associated with a temperature measurement, according to some embodiments. Method 400 may, for example, be performed by system 100 shown in FIG. 1 and/or system 200 shown in FIG. 2. Method 400 provides a way to easily and efficiently capture video of a food safety measurement being made. For example, a user of system 200 making a food safety measurement (e.g., measuring the temperature of food) may need to provide input to the mobile computer to indicate that recording is to start, which may make it hard for the user to operate the device to perform the measurement at the same time. In addition, a user may inadvertently record a video using the mobile computer that does not properly show the measurement taking place, which may result in an inaccurate or non-existent record of the measurement taking place.

Method 400 begins with act 410 in which a trigger event occurs. The trigger event may be any event that indicates a sensor measurement will take place. For example, the trigger event may comprise user input (e.g., a user providing an instruction to begin a measurement, such as via a user interface), or an indication that the device being used is in a particular location. In the illustrated embodiment of FIG. 4, the trigger event comprises detection of the insertion of a probe. For example, a user may insert a temperature probe into food to measure the temperature of the food. The insertion may be detected via any suitable method, such as by capturing the temperature measured by the probe at intervals and identifying a temperature change. For food intended to be kept either hot or cold, (i.e., above or below room temperature, respectively) identifying a temperature change may include detecting when the temperature rises above a particular level or falls below a particular level, respectively. Alternatively, or in addition, identifying a temperature change may include detecting the rate of change of the temperature over time and noting when the temperature changes more rapidly than a threshold rate.

In act 420, a start time is identified. Identification of the start time may be based on any suitable event, including but not limited to a location of a logging device, a time of day, etc. In the illustrated embodiment of FIG. 4, the start time is identified based on the detection of a probe insertion in act 410. Identification of the start time may allow a video to be recorded beginning at the start time. In some embodiments, a video camera (e.g., image sensor 271 shown in FIG. 2) begins recording video when the start time is identified. In other embodiments, a video camera (e.g., image sensor 271 shown in FIG. 2) captures video prior to act 420, yet does not store the video for longer than some period of time (e.g., 5 seconds, or a time based on a particular memory usage). When the start time is identified, this indicates that the video should instead be stored for a longer time; namely, at least until a stop time is identified. This approach may ensure that once probe insertion is determined, a video can be produced that begins quickly after that moment. This approach may also reduce the size of the captured video and accordingly utilize less memory space on the mobile computer.

In act 430, it is determined whether a probe is recognized in the video. When the probe is not recognized, it may be that the video will not contain an accurate record of the temperature measurement, and accordingly it may be desirable to begin capture of the temperature measurement from a starting position again. For example, image recognition of the video performed by software and/or hardware may identify that the probe is not recognized in the video. Alternatively or additionally, feedback may be provided to a user (e.g., via one or more user interfaces) indicating that the probe is not recognized in the video.

Recognition of a probe may be performed in any suitable manner. For example, the mobile computer may perform image recognition on one or more frames of video being captured to identify whether a probe is correctly framed within the image. In some embodiments, a symbol is attached to a probe allowing the mobile computer to easily recognize whether the probe is correctly framed within the image. Such a symbol may, for example, be provided via a sticker that is adhesively attached to the handle of a probe device. This approach may allow industry standard probes to be used yet also easily allow effective recognition of the probe to be performed by the mobile computer.

In general, however, any suitable image analysis may be performed on the video to generate operative information used to ensure proper logging of environmental data. For example, if a video is too dark (e.g., because of lighting conditions), the video may not represent an accurate record of the measurement taking place, even if recognition of a probe was performed successfully. In the event of a dark video, a user may for example be prompted to adjust lighting conditions to ensure an accurate record of the measurement. However, this is provided merely as an example as in general any suitable image analysis to identify an inaccurate video record may be used.

Recognition of the probe may entail processing the video to determine other parameters of the measurement made with the probe. Processing within the mobile computing device or other suitable computing device may detect markings or other identifying characteristics on the probe, including color or shape. Detected characteristics may enable comparison of the probe type in use to a probe type required for a measurement to be made according to a stored monitoring protocol. Alternatively or additionally, detected characteristics may allow improper use of the probe to be identified by, for example, detecting that portions of the probe intended to be inserted into an item being measured are visible in the video. Deviations from the protocol can be recorded as part of the logging, may alter the logging or may be the basis of a message sent to a user or other party identifying a potential problem with the monitoring process.

As a specific example, if it is determined in act 430 that the probe is not recognized in the video, in act 440 recording ends. An indication may be provided to a user of the mobile computer that the measurement is to begin from a starting position, for example via a display connected to the mobile computer (e.g., built-in displays and/or displays connected to the mobile computer).

If it is determined in act 430 that the probe is recognized in the video, filming of video continues until act 450 in which removal of the probe is detected. Removal of the probe may be detected in any suitable way, including any of the techniques described above in relation to act 410 and detection of insertion of the probe.

In act 460, a recording stop time is identified, which may be based upon the detection of probe removal in act 450. Identification of the start time may be used such that the video being recorded ends at the recording stop time. The video may then be combined with the temperature sensor data and logged via the techniques discussed above.

Figure 5:
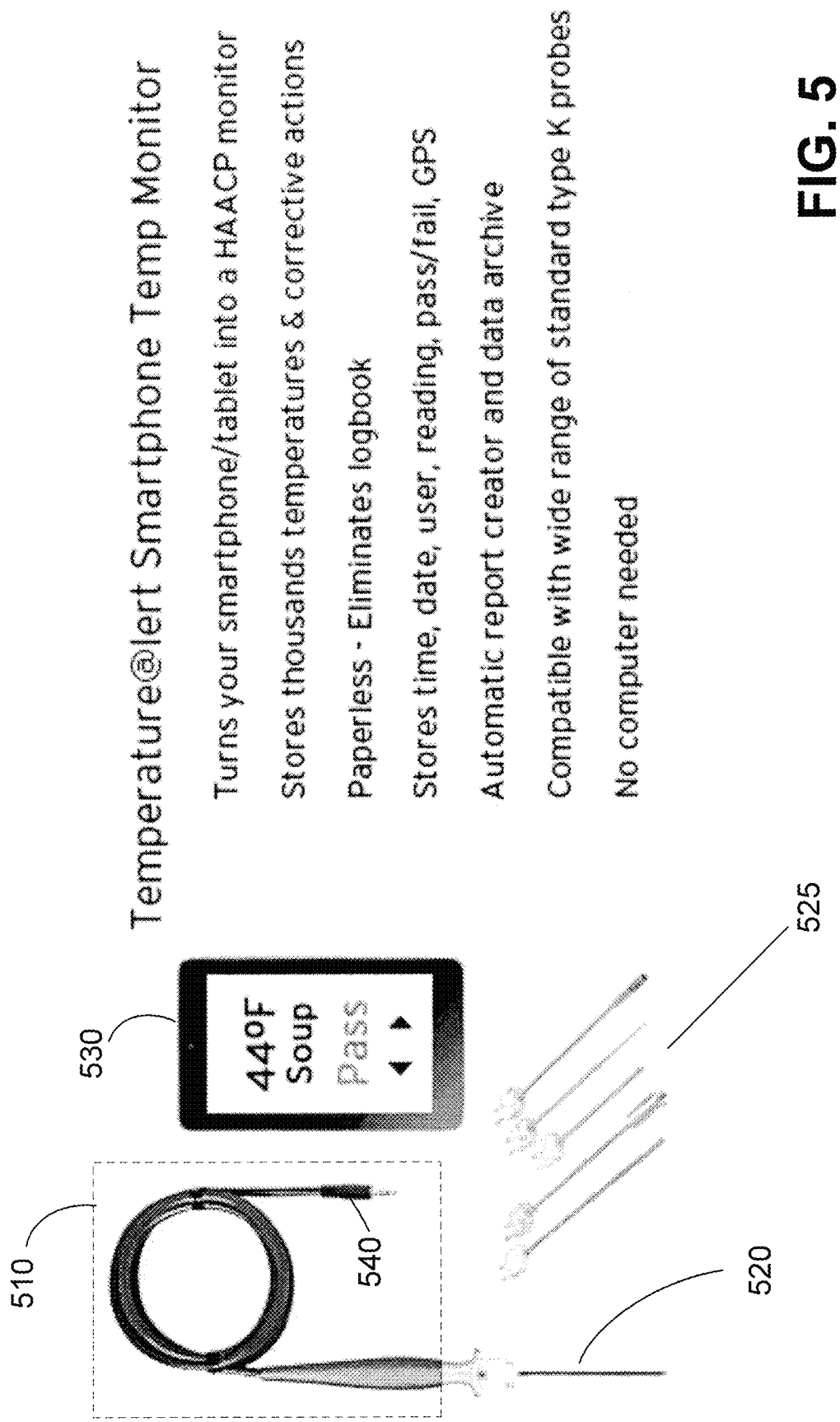
FIG. 5 provides an overview of an application suitable for use with a smartphone that utilizes industry standard temperature probes, according to some embodiments.

FIG. 5 provides an overview of an application suitable for use with a mobile computer, which in this example is a smartphone, that utilizes industry standard temperature probes, according to some embodiments. FIG. 5 depicts an industry standard K type temperature probe 520 coupled to interface component 510 (shown within dashed lines).

Interface component 510 includes audio connector 540 which may be connected to smartphone 530 via a suitable audio connector (not shown). FIG. 5 additionally depicts a set of industry standard probes 525 that are interchangeable with probe 520 to connect with interface component 510 by mating a connector on a probe with a connector on the interface component.

FIG. 5 also illustrates a user interface on smartphone 530. Such a user interface may be rendered by a monitoring application, implemented using known programming techniques executing on smartphone 530. In this example that monitoring application has access to a data set defining a monitoring protocol. That monitoring protocol may define measurements for a plurality of locations. The protocol, for example, may identify the item at each location, the type of measurement to be made, the type of probe to be used in making the measurement, the frequency of measurements, allowable range of measured values or allowable variation in the measured values, actions to be taken when a deviation from the protocol is detected, other monitoring data to be sored in connection with a measurement from a probe, etc.

The protocol may be stored in computer memory on the smartphone or may be in any suitable computing device to which the smartphone is coupled. Likewise, though the monitoring application may execute on smartphone 530, it should be appreciated that the monitoring application may execute on a server or remote computing device to which smartphone 530 is connected. The software executing on smartphone 530 may, in such an embodiment, exchange data with the server or other remote device.

Interface component 510 may be implemented in any suitable way. In some embodiments, interface component may be implemented using known signal processing components. Those components may be interconnected and packaged as a handle or in any other suitable form factor. The specific components used in constructing interface component 510 may be selected based on the nature of the probe output and the input interface on the mobile computer through which probe data will be transmitted. In some embodiments, interface component 510 comprises a multiplexor, a linear regulator, a counter and/or a low pass filter and is configured to connect to an audio port on a mobile computer.

In some embodiments in which the input interface is an audio input, the interface component may include a multiplexer, connected to one or more probe connectors, such that an output of one or more probes connected to interface component 510 may be selectively coupled to further circuitry. That further circuitry may include a linear regulator coupled to a low pass filter. The low pass filter may reduce measurement noise and condition a signal output by the probe for further processing. That signal may then be supplied to a counter which, for example, may generate an output proportional to the rate at which pulses are output by the probe. Where the rate at which pulses are produced signifies a value measured by the probe, by periodically resetting the counter, the output of the counter may be used as an indication of that rate. Thus, the output of the counter represents a value measured and may be used, for example, to modulate a signal in the frequency range that can be processed by circuitry within a smartphone for processing an audio signal (i.e. the counter output may be used to modulate an audio signal generated by other circuit elements within the interface component. However, any suitable circuitry may be used to convert a signal from a format suitable for one interface to another.

Figure 6:
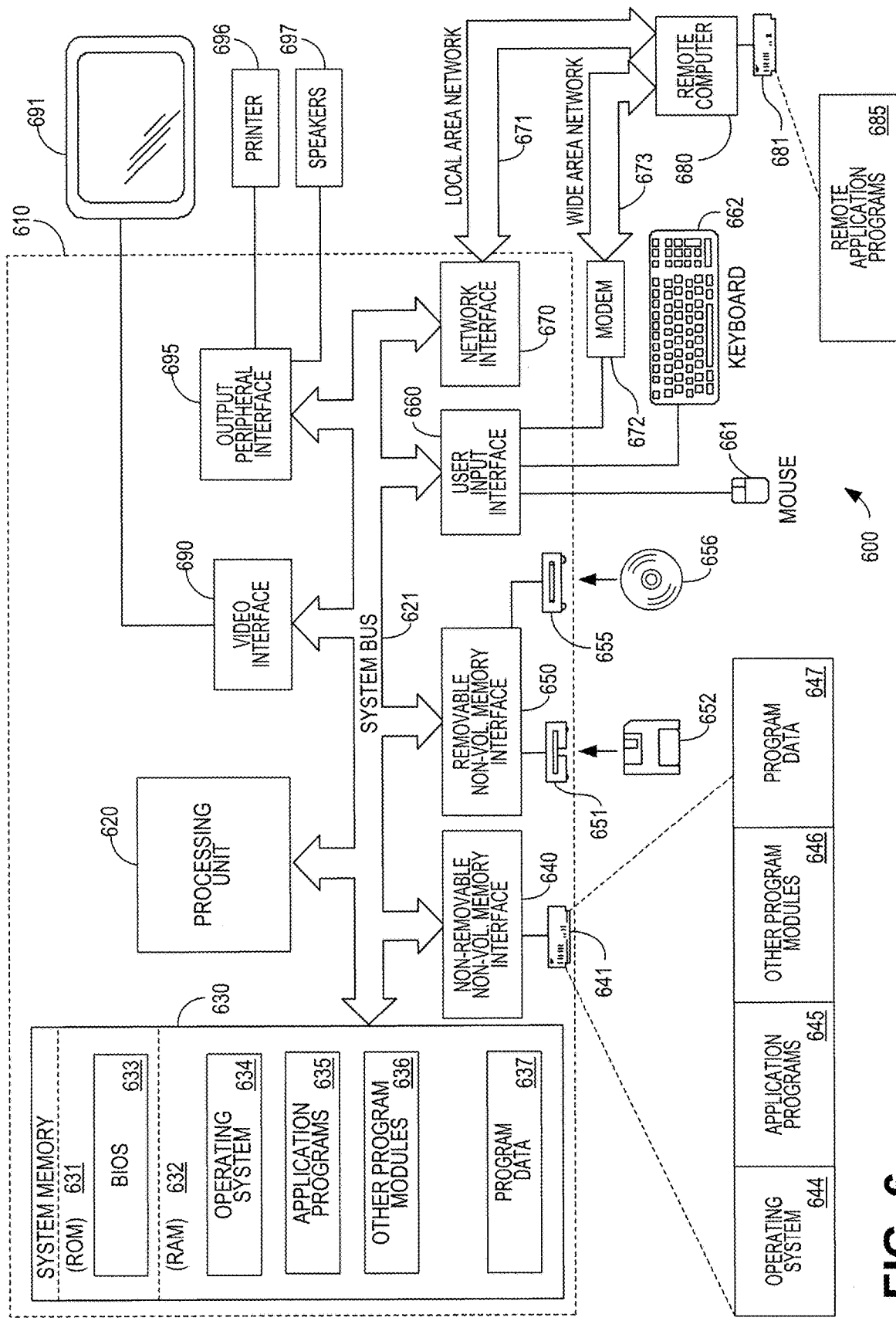
FIG. 6 illustrates an example of a computing system environment on which aspects of the invention may be implemented.

FIG. 6 illustrates an example of a suitable computing system environment 600 on which aspects of the invention may be implemented. For example, the computing system environment 600 may be used to implement some or all of mobile computer 130 shown in FIG. 1, and/or mobile computer 250 shown in FIG. 2. Such a computing environment alternatively or additionally represents a server or other remote computing device.

The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to perform capture, modification, combining and/or logging of sensor data. Example of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. For simplicity of illustration, data structures may be described as having fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art.

For example, techniques for capturing and logging environmental data were described. Temperature was used as an example of environmental data herein, but the techniques are not so limited. These techniques may be applied in other contexts. For example, industrial applications other than food safety may use techniques as described herein and environmental data other than temperature may be captured.

Such modifications and improvements are intended to be within the spirit and scope of the invention. Accordingly, the foregoing description is by way of example only, and is not intended as limiting.

What is claimed is:

1. A handheld computer comprising:
a video camera on the handheld computer;
at least one output; and
at least one processor configured to:
  guide a user of the handheld computer, via the at least one output, to perform at least one action with a probe according to a stored monitoring protocol;
  receive, from the video camera, information relating to a measurement of an environmental condition, wherein the measurement is made using the probe, wherein the measurement comprises a temperature, a humidity, a pressure, a water quality, a gas indication, a radiation level, or an indication of contamination;
based on the information, determine whether the at least one action with the probe was performed according to the stored monitoring protocol; and
in response to determining, based on the information, that the at least one action with the probe includes at least one deviating action by the user from the stored monitoring protocol, guide the user to perform a corrective action to correct the at least one deviating action by the user.

2. The handheld computer of claim 1, wherein:
the protocol identifies at least one of:
an item at each of a plurality of locations of measurements,
a type of measurement that the measurement should be,
a type of probe to be used in making the measurement,
the frequency of measurements,
allowable range or allowable variation in measured values,
actions to be taken when a deviation from the protocol is detected, and
monitoring data to be stored in connection with the measurement.

3. The handheld computer of claim 1, wherein:
the at least one processor is configured to:
compare the action and/or results of the action to the protocol; and
if the action and/or the results do not satisfy the protocol,
log that the results do not satisfy the protocol.

4. The handheld computer of claim 1, wherein:
the at least one processor is configured to:
determine whether the probe is being used improperly based on the information.

5. The handheld computer of claim 1, wherein:
the handheld computer is configured to record a signal representative of a value from the probe based on the measurement of the environmental condition.

6. The handheld computer of claim 5, wherein:
the handheld computer is configured to record, in association with the signal, the information, wherein the information is available via one or more components of the handheld computer including the video camera.

7. The handheld computer of claim 6, wherein:
the signal and the information creates a log of monitoring.

8. The handheld computer of claim 7, wherein:
the information comprises a time when the measurement was determined, a location where the measurement was determined, a user that caused or allowed the measurement to be determined, and/or an indication of whether the signal fits a criterion.

9. The handheld computer of claim 7, wherein:
the information comprises video and/or audio of the measurement being determined, wherein the video and/or the audio is configured to provide:
a record of the measurement being determined; and
supplemental information about an object measured, a region measured, and/or conditions of the measurement.

10. The handheld computer of claim 6, wherein:
the handheld computer is further configured to:
perform processing of the signal and/or the information; and
selectively generate a message and/or a report based on results of the processing.

11. The handheld computer of claim 10, wherein:
the processing of the signal and/or the information comprises comparing the signal and/or the information to the stored monitoring protocol.

12. The handheld computer of claim 11, wherein:
the stored monitoring protocol comprises a predefined acceptable range of the signal and/or of the information, wherein the information comprises a time of measurement, a frequency of measurement, a location of measurement, and/or a measurement method.

13. The handheld computer of claim 11, wherein:
the message comprises an alert indicating that the signal and/or the information deviates from the stored monitoring protocol.

14. A method of operating a handheld computer comprising a video camera, the method comprising:
receiving video information from the video camera;
processing the video information to determine:
whether the video information depicts a measurement, made using a probe, of an environmental condition, wherein the measurement comprises a temperature, a humidity, a pressure, a water quality, a gas indication, a radiation level, or an indication of contamination; and
whether the measurement using the probe is performed according to a stored monitoring protocol; and
storing the video information.

15. The method of claim 14, wherein the method comprises:
guiding the user of the handheld computer to perform at least one action according to the protocol.

16. The method of claim 14, wherein the method comprises:
recording a signal representative of a value from the probe based on the measurement of the environmental condition.

17. The method of claim 14, wherein the method comprises:
comparing the measurement using the probe to the protocol; and
if the measurement using the probe does not satisfy the protocol,
logging that the measurement using the probe does not satisfy the protocol.

18. The method of claim 14, wherein:
the video information is configured to provide:
supplemental information about an object measured, a region measured, and/or conditions of the measurement.

19. The method of claim 14, wherein the method comprises:
based on determining that the measurement using the probe was not performed according to the stored monitoring protocol, guiding the user to perform a corrective action.

20. The method of claim 19, wherein:
the video information further comprises a time when the measurement was determined, a location where the measurement was determined, and/or a user that caused or allowed the measurement to be determined.

21. The method of claim 19, wherein:
the video information is configured to provide:
supplemental information about an object measured, a region measured, and/or conditions of the measurement.

22. The method of claim 21, further comprising:
detecting a trigger event;
identifying a start time for recording by the video camera;
determining whether the recording is proper;
if the recording is determined to be proper, continuing the recording; and
upon detecting removal of the probe, identifying a stop time for the recording and stopping the recording at the stop time.

23. The method of claim 22, wherein:
detecting the trigger event comprises detecting an indication that the measurement will be determined, wherein the indication comprises user input, a location of the probe or the handheld computer, and/or insertion of the probe.

24. The method of claim 14, further comprising:
selectively generating a message and/or a report based on results of the processing.

25. The method of claim 24, wherein:
the stored monitoring protocol comprises a predefined acceptable range of the video information, wherein the video information further comprises a time of measurement, a frequency of measurement, a location of measurement, and/or a measurement method.

26. The method of claim 24, wherein:
the message comprises an alert indicating that the measurement using the probe deviates from the stored monitoring protocol.

27. The method of claim 14, further comprising:
guiding the user to perform a corrective action by providing an additional opportunity to perform the measurement using the probe.

28. The method of claim 27, wherein:
providing an additional opportunity to perform the measurement using the probe comprises indicating to the user that the measurement should be performed again from a starting position.

29. The method of claim 27, wherein:
providing an additional opportunity to perform the measurement using the probe comprises providing to the user a message identifying a potential problem relating to the performed measurement using the probe.

30. A non-transitory computer readable storage medium encoded with computer-executable instructions that, when executed by a processor, cause a handheld computer to perform a method, the method comprising:
guiding a user of the handheld computer according to a stored monitoring protocol to perform at least one action using a probe, wherein the action comprises taking a measurement comprising a temperature, a humidity, a pressure, a water quality, a gas indication, a radiation level, or an indication of contamination;
determining whether the at least one action was performed using the probe according to the stored monitoring protocol; and
based on determining that the at least one action was performed according to the stored monitoring protocol, storing a video recorded using a video camera on the handheld computer depicting the at least one action.

31. The non-transitory computer readable storage medium of claim 30, wherein the method further comprises:
based on determining that the at least one action was not performed according to the stored monitoring protocol, guiding the user to perform a corrective action to correct at least one deviating action from the stored monitoring protocol.

* * * * *